United States Patent [19]

Pavlik

[11] Patent Number: 4,854,340

[45] Date of Patent: Aug. 8, 1989

[54] TOILET-TANK FLOAT-BOOSTER

[76] Inventor: John P. Pavlik, 20411 Lassen St., Chatsworth, Calif. 91311

[21] Appl. No.: 191,889

[22] Filed: May 9, 1988

[51] Int. Cl.⁴ .................... F16K 31/18; F16K 33/00
[52] U.S. Cl. ............................ 137/425; 4/415; 73/322.5; 137/426
[58] Field of Search ............... 73/322.5; 137/424, 425, 137/426, 434; 4/415, DIG. 1

[56] References Cited

U.S. PATENT DOCUMENTS

| | | | |
|---|---|---|---|
| 905,787 | 12/1908 | Boggess | 137/425 |
| 1,177,963 | 4/1916 | Peterson | 137/426 |
| 1,349,267 | 8/1920 | Craig | 137/425 |
| 1,418,845 | 6/1922 | Stetson | 137/425 |
| 2,724,403 | 11/1955 | DeSalardi | 137/426 |
| 3,331,387 | 7/1967 | Walters | 137/426 |
| 3,932,900 | 1/1976 | Huston et al. | 4/415 |
| 4,167,951 | 9/1979 | Hume | 137/426 |

Primary Examiner—George L. Walton

[57] ABSTRACT

A water - buoyant, water-saving device, attachable to undersurface of a toilet Flush-Tank Float so as to add to buoyant force of Float that causes closure of Flush-Tank water inlet-valve. Since buoyant closure force obtains when tank water has risen enough to contact and lift Tank-Float, the buoyant body of this device, placed below the Tank-Float, provides additional buoyant force at a lower water level. Often the buoyant force of Tank-Float is not adequate to close water inlet-valve before water rises so high it wastes into tank overflow pipe. This device contributes the additional buoyant force that can eliminate this problem. Lines equidistant from all sides are marked on buoyant body as guides for symmetrical cut-off to facilitate within-tank fit and/or to reduce buoyant effect. By such selective buoyancy negation the water level in Flush-Tank is adjustable to prevent wasteful overflow and to set water level for lowest water volume for effective flushing.

4 Claims, 2 Drawing Sheets

TOILET-TANK FLOAT-BOOSTER

BACKGROUND OF THE INVENTION

A common cause of wasting domestic water is a flush-toilet water inlet-valve that does not close when the water has risen to a desired level and water continues to fill tank until it dumps into overflow pipe. Often this is a quiet, small flow that causes great water loss as it continues for long periods of time undetected. Some of the reasons for this malfunction are decreasing efficacy of seating members of the water inlet-valve and variations in water pressure in which an increase is too strong a force for the shut-off setting of the tank float. A float setting could be correct for a time when many are watering their lawns but if it rains or becomes non-gardening season the water pressure can increase and the original shut-off setting is too weak to close inlet-valve before water rises to overflow level. A common remedy is to bend the float-rod downward to increase the buoyant force of the float at a water level below the overflow level. This hit and miss approximation by bending is immediately effective in lowering the water level at which inlet-valve closes but, eventually, further hit and miss bending and unbending is necessitated as pressures and valve efficiency change. Since a dead-center downward bend is practically impossible there is a tendency for the float, as a resultant force of its upward buoyant force, to revolve around the original axis of the float rod which is threaded into the inlet-valve. Often these threads become loose and the float revolves 180 degrees or, if the bend has been severe, the float will revolve about 45 degrees and scrape along the tank wall. In either event there is much water loss and inconvenience before the condition is corrected.

Another common cause of domestic water waste is a flush tank water level that is higher than necessary to effectively flush the toilet bowl.

SUMMARY OF THE INVENTION

The instant invention provides a simple, inexpensive, easily installed means of variably increasing buoyant force on water inlet-valve at a lower than pre-existent (pre-installed) tank water level. Inasmuch as this device not only adds a buoyant body but positions that body below the existent tank float, the greater the amount of additional buoyancy obtained from this device the lower the water level at which the water inlet-valve will close. By adjusting the effective buoyancy of this device the water level at which water inlet-valve closes is adjustable. The instant invention has guide lines on buoyant body equidistant from all sides for symmetrical cut-off to facilitate within-tank fit and/or to reduce its buoyant effect a desired amount so as to attain water inlet-valve closure at a desired tank water level. Installation of this device requires no tools and does not necessitate any changes in the existent flush tank mechanism.

One object of the instant invention is to save water by eliminating toilet tank overflow waste and by lowering tank water level to decrease volume of flush water to the minimum needed to effectively flush toilet bowl.

Another object of the instant invention is to relieve overloading of domestic and municipal sewage systems by conserving redundant water in sewage effluent caused by wasteful water overflow in toilet flush tanks and by lowering the tank water level to decrease volume of flush water to minimum needed for effective flushing.

BRIEF DESCRIPTION OF THE DRAWINGS

A fuller understanding of the invention will be had by referring to the following description of a preferred embodiment thereof, taken in conjunction with the accompanying drawings wherein like reference characters refer to similar parts throughout the several views and in which.

DESCRIPTION OF THE PREFERRED EMBODIMENT

For a better understanding of the present invention, reference is made to the following description taken in connection with the accompanying drawings, and its scope will be pointed out in the appended claims.

Figure 8:
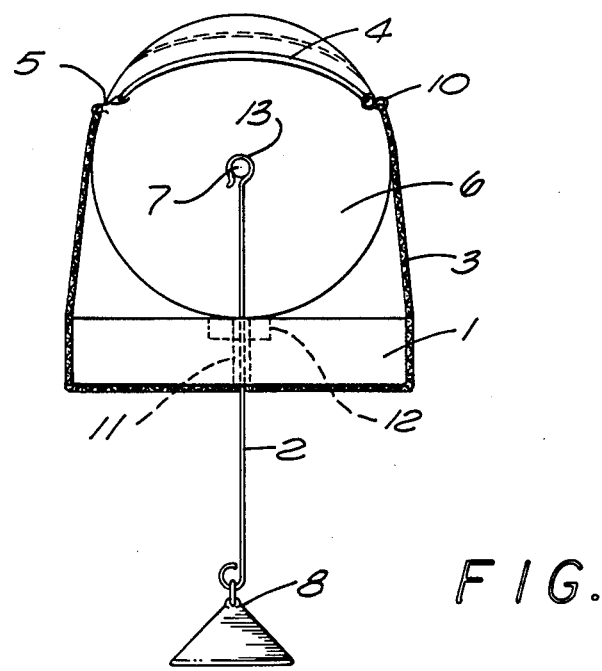
FIG. 8 is a front elevational view of an embodiment of this invention comprising all of the parts shown in FIGS. 1 to 7 installed on a Toilet Flush-Tank Float shown in front elevation and the Float-Rod shown in cross section.
Figure 9:
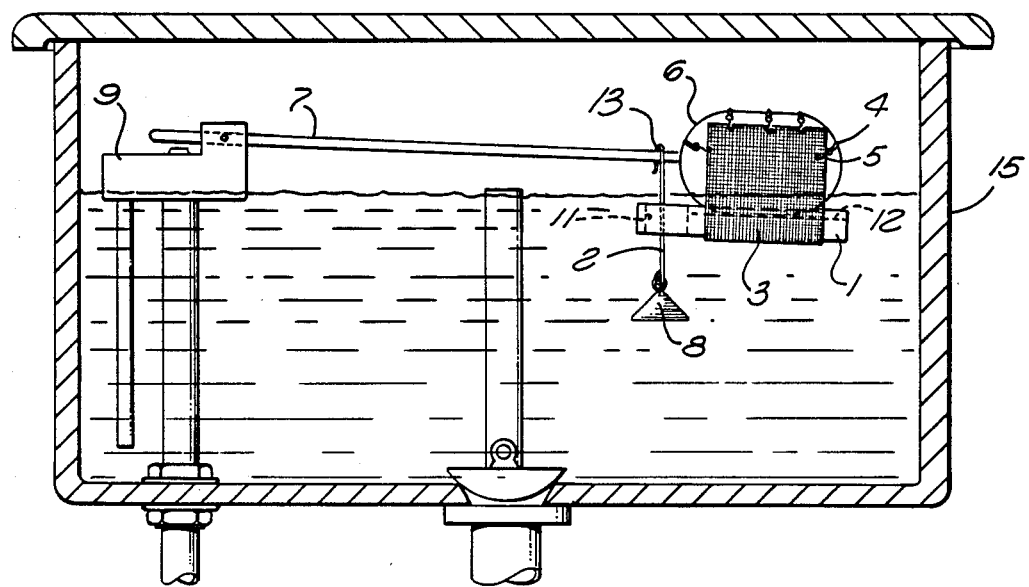
FIG. 9 is a view partly in vertical section and partly in Elevation Showing a Preferred Embodiment of the Invention in operative association with a conventional domestic toilet flush tank.

FIG. 9 shows a conventional domestic toilet flush tank 15 of the type used with a conventional domestic toilet bowl. Tank float 6 is water buoyant and by means of connection to end of float rod 7 which is a lever it causes opening of water inlet valve 9 that is controlled by end of the short arm 16 of float rod layer 7 when tank float 6 drops during flushing process. Float 6 causes closing of water inlet valve 9 after flushing is completed and tank water rises enough to create adequate buoyant force upon tank float 6 to cause adequate upward movement of long arm 17 of flush rod 7. Shown in FIG. 9, in attachment to underside of tank float 6, is the instant invention comprising the buoyant body 1, plastic screening 3, rubber bands 4, hooks 5, rigid plumb line 2 and keel weight 8. Buoyant body 1 is fitted horizontally to lowest part of underside of tank float 6 by means of a median groove 12 of FIGS. 1, 8 and 9 in buoyant body and banded tightly to float 6 in this position by screening 3 of FIG. 9 made taut around buoyant body 1 and float 6 by approximation of screening flaps brought up along opposite sides to the top of tank float 6 with stretched rubber bands 4 anchored in ends of screening 3 by loops and hooks 5. Tank float 6 and attached thereto buoyant body 1 are limited in lateral-rotational movement by rigid wire plumb line 2 suspending from float rod 7, passing through a slot 11 on parallel-to-float-rod midline of buoyant body 1 and terminating in suspended weight 8 functioning as a keel weight to keep plumb line 2 vertical, buoyant body 1 horizontal and slot 11 below float rod 7.

Figure 1:
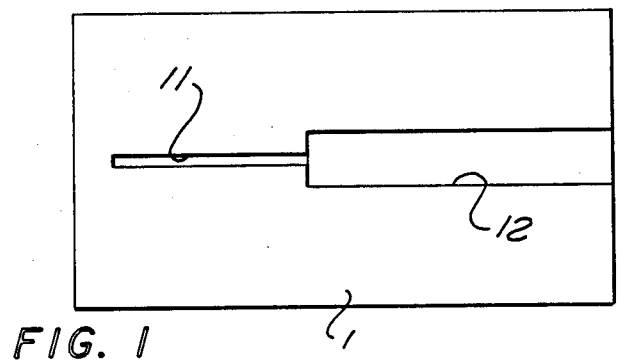
FIG. 1 is a top plan view of the buoyant body of an embodiment of present invention.
Figure 3:
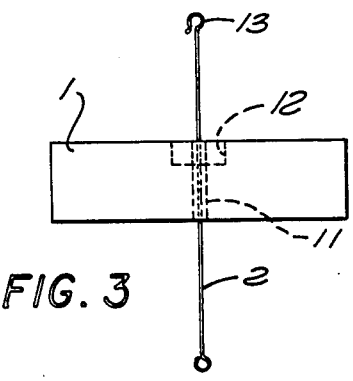
FIG. 3 is a front elevational view of the buoyant body shown in FIG. 1 showing a length of wire passed through the buoyant body, upper end of the wire formed into a crook and lower end formed into a loop.
Figure 2:
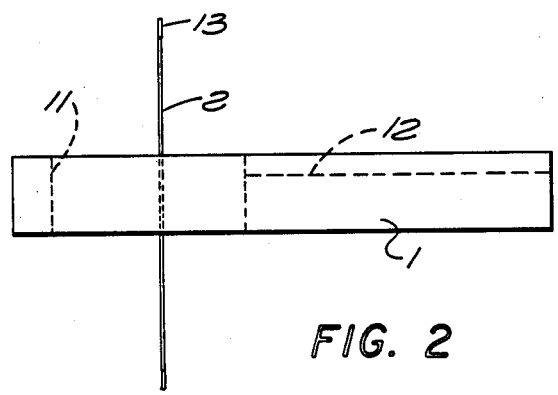
FIG. 2 is a side elevational view of the buoyant body shown in FIG. 1 showing a length of wire passed through the buoyant body, upper end of the wire formed into a crook and lower end formed into a loop.
Figure 4:
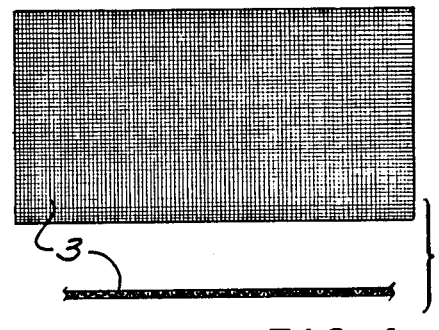
FIG. 4 shows a band of screening in top plan view and in cross section.
Figure 5:
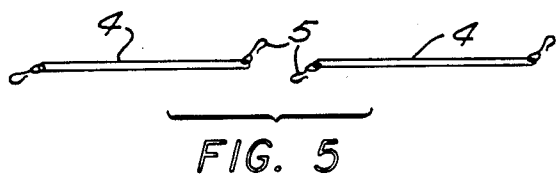
FIG. 5 shows two rubber bands, each band with two hooks attached.
Figure 6:
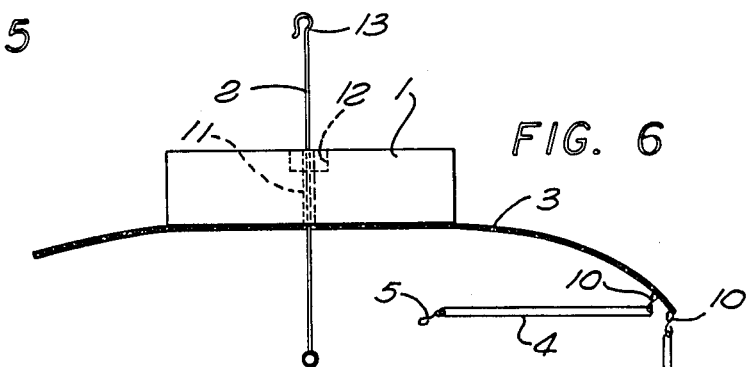
FIG. 6 is a front elevational view showing buoyant body and wire shown in FIG. 3 with screening shown in FIG. 4 attached to undersurface of buoyant body, two rubber bands shown in FIG. 5 attached to one end of screening by closing of hooks shown in FIG. 5 into loops.
Figure 7:
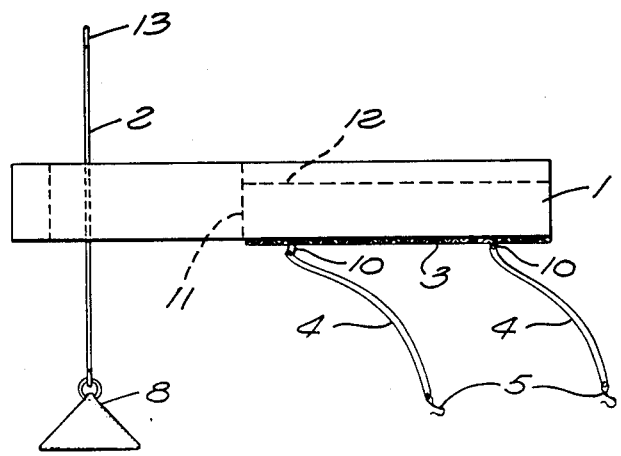
FIG. 7 is a side elevational view showing buoyant body and wire shown in FIG. 2 with screening shown in FIG. 4 attached to underside of buoyant body, rubber bands shown in FIG. 5 attached to one end of screening by closing of hooks shown in FIG. 5 into loops, keel weight installed.

The Buoyant Body, 1, of FIG. 1, is a slab of rigid polystyrene foam $3\frac{3}{4}'' \times 7'' \times 1''$. On the longitudinal midline of a broad surface of the Buoyant Body, starting $\frac{1}{4}''$ from a $3\frac{3}{4}''$ side, a perpendicular slot approximately $1/16'' \times 2\frac{1}{2}''$ is cut with a hacksaw blade held in the hand and worked at a very acute angle to start the slot, 11 of FIG. 1. On the same midline, from the slot to the other $3\frac{3}{4}''$ side, a groove, 12 of FIG. 1, about $\frac{3}{4}''$ wide and $\frac{1}{4}''$ deep is cut with a file so it runs equidistant from each of the 7'' sides. A $4'' \times 9''$ band of plastic screening, 3 of FIG. 4, is attached with contact cement transversely to the ungrooved broad surface of the Buoyant Body at the unslotted end so that $3'' \times 3\frac{3}{4}''$ at the other end remains unscreened, FIG. 7, and a $2\frac{5}{8}'' \times 4''$ flap of screening, 3 of FIG. 6, is free on each side of the Buoyant Body, 1. Four 2'' lengths of 14 gauge brass wire are bent into the configuration of fishing hooks, 5 of FIG. 5, and a rubber band, 4 of FIG. 5, is attached to each pair of hooks by means of the hook eyes. A hook of each rubber band is hooked along the edge of a 4'' side of one screening flap about 3'' apart and the hooks are closed into loops, 10 of FIG. 7. A 9'' length of 12 gauge brass wire, 2 of FIGS. 2 and 3, is bent into a crook at one end and a loop at the other. The so bent wire is pushed through the slot of the Buoyant Body 1, of FIGS. 2 and 3, to about its mid-length so that the crook, 13, is on the same side as the groove, 12. A 1 oz. lead fishing weight with a brass eye, 8 of FIG. 7, is hung from the loop end of the wire, 2 of FIG. 7.

As shown in FIG. 8:

The Buoyant Body, 1, with groove up, is centered beneath a Toilet-Tank Float, 6, by means of the groove, 12, and by hanging the down-mouthed crook, 13, over the Float Rod, 7. Each flap of screening, 3, is pulled up on opposite sides of the Tank-Float towards its top. By stretching the rubber bands, the hooks, 5, are pulled over the top of the Tank Float, 6, and down the other side to the rubber-band free flap and anchored therein so as to hold the Screening, 3, taut around the Buoyant Body, 1, and Tank Float, 6. Buoyant Body 1 can be symmetrically trimmed along marked lines equidistant from all sides to facilitate within-tank fit and/or to reduce buoyant effect.

What is claimed is:

1. A water saving device for use with a toilet flush tank having float operated control valve means for regulating the water level in the tank, a water buoyant float and rod operatively connecting the float with the control valve means, which comprises a water buoyant body, flexible means for surrounding said buoyant body and said float and for attaching said water buoyant body to the underside of said toilet tank float, stabilizing means extending from said float rod and through said buoyant body for limiting lateral-rotational movement of said tank float and said buoyant body while maintaining said buoyant body in a stabilized position, markings on buoyant body for enabling material on said buoyant body to be cut off to fit in different size float tanks and for reducing the buoyancy of said buoyant body, whereby said buoyant body, being positioned under said tank float for a greater buoyancy boost effect for a given amount of material that is has been in contact with and attached to said tank float, can boost said tank float at varying intensities dependent on the size of said buoyant body to cause closure of said control valve means at varying levels of water in said flush tank without malfunction due to lateral-rotational movement of said buoyant body and said tank float.

2. A device as defined in a claim 1 wherein said buoyant body is a slab in attachment in horizontal position to the underside of said tank float by a band of screening with a length of band transverse to the axis of said float rod, said band of screening having band ends leading upward to opposite sides of said float and pulled toward each other under tension of an elastic means anchored in each screening band end, said buoyant body having a groove means positioned on a median line of the upper surface of said buoyant body, and extending from an end distal to the juncture of said float rod and the float to a point near the opposite end of the buoyant body, a slot extending along said median line from said point to close proximity of said opposite end in a position under said juncture of said float rod and float, a vertical length of rigid wire extending through and beyond the upper and lower ends of said buoyant body with a crook formation in the upper end of said rigid wire, said rigid wire and ending in a loop holding a weight in suspension, whereby said groove functions to facilitate centering of said tank float on said buoyant body and to prevent shifting of said float on said buoyant body, said weight maintains said wire in a vertical position from its suspension from said float rod, and said wire being confined within said slot for maintaining said buoyant body in a horizontal position with said slot being below said float rod.

3. A device as defined in claim 2 wherein said buoyant body is of plastic, said screening is of plastic, said band ends are loops connecting one end of said screening band to one end of said elastic means and hooks being positioned in said loops and attaching said hooks to said band of screening for stretching said elastic means and keeping said screening taut around said buoyant body and said tank float.

4. A device as defined in claim 3 wherein said buoyant body is of rigid polystyrene foam, said loops and hooks attaching said screening band ends to said elastic means are of wire and said elastic means is rubber bands.

* * * * *